(12) United States Patent
Meggs et al.

(10) Patent No.: US 8,746,739 B2
(45) Date of Patent: Jun. 10, 2014

(54) AIRCREW RESTRAINT SYSTEM WITH INTEGRATED COMMUNICATIONS AND CONTROLS

(75) Inventors: Daniel Meggs, Las Vegas, NV (US); Donald Blackman, Bradenton, FL (US); Brian Ford, Seminole, FL (US); Justin Robinson, Parrish, FL (US); M. Elizabeth Bolint, Tampa, FL (US)

(73) Assignee: Carlston Life Support Systems, Inc., Davenport, IA (US)

( * ) Notice: Subject to any disclaimer, the term of this patent is extended or adjusted under 35 U.S.C. 154(b) by 259 days.

(21) Appl. No.: 13/166,217

(22) Filed: Jun. 22, 2011

(65) Prior Publication Data

US 2012/0325586 A1    Dec. 27, 2012

(51) Int. Cl.
*B64C 1/00*    (2006.01)
*B64D 11/00*    (2006.01)

(52) U.S. Cl.
USPC ............... 280/748; 104/93; 182/231; 182/3; 244/118.5; 340/457.14

(58) Field of Classification Search
USPC ............ 280/748, 808; 104/88.02, 93; 182/3, 182/231; 191/33 R; 244/118.5, 122 AG, 244/122 B, 122 R, 129.1; 340/457.1
See application file for complete search history.

(56) References Cited

U.S. PATENT DOCUMENTS

| | | | |
|---|---|---|---|
| 3,756,339 A | 9/1973 | Cornelison, Jr. et al. | |
| 4,801,105 A | 1/1989 | Frisk | |
| 4,967,985 A | 11/1990 | Deakin | |
| 5,636,807 A | 6/1997 | Warrick | |
| 6,148,580 A * | 11/2000 | Weir | 52/651.1 |
| 6,264,146 B1 | 7/2001 | Hill et al. | |
| 6,299,102 B2 | 10/2001 | Happ | |
| 6,315,138 B1 * | 11/2001 | Dyson | 212/336 |
| 6,805,226 B1 | 10/2004 | Ross et al. | |
| 7,275,710 B2 | 10/2007 | VanDruff et al. | |
| 2006/0284012 A1 | 12/2006 | VanDruff et al. | |
| 2007/0235588 A1 | 10/2007 | French | |
| 2009/0019623 A1 | 1/2009 | Uchida et al. | |

* cited by examiner

*Primary Examiner* — Drew Brown
(74) *Attorney, Agent, or Firm* — Woods Oviatt Gilman LLP; Katherine H. McGuire, Esq.

(57) ABSTRACT

Disclosed is a restraint system for a vehicle, such as a wheeled vehicle, boat, or fixed or rotary winged aircraft. The system includes a control system integrated into the harness and strap of the restraint. This permits crewmembers to lock and unlock the restraint from a body worn control panel. Other auxiliary equipment also be operated from the control panel. In another embodiment, wiring for a communication system is integrated into the harness and strap.

17 Claims, 6 Drawing Sheets fig.2

AIRCREW RESTRAINT SYSTEM WITH INTEGRATED COMMUNICATIONS AND CONTROLS

BACKGROUND OF THE INVENTION

1. Field of the Invention

The present invention relates to a system for restraining persons within a vessel, vehicle, aircraft, spacecraft or shelter structure [hereafter "common environment"] with i) remote control of the mobility and counter restraint of movement within the common environment and also ii) integrated electronic information transmission pathways as part of the system. An alternative embodiment is to utilize a textile as the medium for conducting communications or data or any electronic/electrical signal among individuals in a common environment such as a vessel, vehicle, aircraft or shelter. The structure of the common environment may be part of the conducting/communication pathway. This second embodiment is particularly applicable in environments where wireless conduction of data or electromagnetic interference is undesirable, such as in combat or military uses, where secrecy is critical, or space and locations on non-Earth bodies.

2. Description of the Background Art

The present invention relates to a passenger restraint for a vehicle, such as wheeled vehicle, tank, vessel, or fixed or rotary winged aircraft, spacecraft or shelter structure "common environment." Occupants of such vehicles often require a full range of movement, including the use of legs and feet to walk around the crew cabin/common environment and the use of arms and hands to carry out various tasks. Occupants must also be able to communicate with others within the common environment. The foregoing is particularly true of military vehicles, vessels and aircraft, wherein the occupant must often perform task, such as firing weapons, opening doors, or moving equipment. The occupants must be able to perform these task while communicating with other crewmembers. Moreover, crewmembers must be able to adequately perform these tasks while being restrained against unexpected vehicle, vessel or aircraft movements or low or no gravity.

Current restraint systems include a harness that is secured to the occupant and a strap or webbing that connects the strap to an overhead reel or some part of the structure of the common environment. During normal vehicle or aircraft operations, for example, the strap can be rolled or unrolled from the reel as needed to facilitate crewmember movement. An accelerometer within the reel locks the strap in the event of sudden or severe movements. This protects the occupant from becoming injured or from falling out of the vehicle, vessel or aircraft, or other unwanted movement. Current restraints require the occupant to thereafter unlock the reel by accessing a release handle adjacent the reel. This requires the crewmember to walk back to the reel and reach up to access the release handle. Current restraint systems also utilize a communication and/or control system that is separate from the restraint.

One such system is described in commonly owned U.S. Pat. No. 7,275,710 to Van Druff et al. Van Druff discloses an aircrew restraint system that includes a track and a trolley that runs along the track. The trolley includes an interlock pin that cooperates with interlock hooks spaced within the track. A webbing strap connects an aircrew harness to a strap retractor. In order for the occupant to release the trolley, they must grasp an overhead handle.

Harness reels are also known in the art for use in connection with restraining a vehicle occupant. For instance, U.S. Pat. No. 4,801,105 to Frisk discloses a reel assembly for retracting and locking a shoulder harness. The assembly includes a strap supporting spool affixed to a ratchet wheel. When a strap is rapidly pulled from the reel, an inertial mass turns with respect to the reel. This causes the inertial mass to move forward axially and trip a dog which locks the reel. After being locked the reel must be reset by accessing a control post.

Likewise, U.S. Pat. No. 5,636,807 to Warrick discloses an acceleration sensor for an aircraft employing an inertial weight. The inertial weight is movable within a chamber by way of a linkage. The linkage is such that it provides the same output in response to movement of the aircraft in multiple directions. Warrick does not disclose a release that is integrated with a strap or webbing.

Although these inventions each achieve their respective objectives, there continues to be a need in the art for a restraint system with integrated communications and controls, whereby crewmembers can be maintain a full range of motion while locking or unlocking the restraint or communicating with other crewmembers.

SUMMARY OF THE INVENTION

It is therefore one of the advantages of the present invention to integrate a common environment restraint with integrated controls to manage movement of the occupant.

It is also an advantage of the present invention to embed any wiring or conductive pathways for the controls into the straps or webbing or textiles worn by the occupant for the restraint.

Another advantage of this invention to utilize the control system of the restraint or body worn textile to operate auxiliary equipment within the common environment.

Still yet another advantage is to permit the occupant to lock and unlock the restraint or information conductive aspect from a body worn control device remotely or electronically not physically.

It is one of the advantages of the present invention to integrate a restraint with associated communications systems, data gathering systems or data transmitting systems.

It is also an advantage of the present invention to embed any wiring or other electronic communications avenues or methods for the communications, data gathering or data transmission system into the straps, webbing or textiles for the restraint.

The foregoing has outlined some of the pertinent advantages of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENTS

The present disclosure relates to a restraint system. The system can be used in conjunction with a wide variety of transportation vehicles, such as wheeled vehicles, vessels, or fixed or rotary winged aircraft, trains, space craft and also shelter structures, ("common environment"). The system includes controls that are integrated into the textile of the restraint. Both the harness and the strap of a typical restraint would include embedded wiring or other methods of creating a conductive pathway for power distribution and transmission of data including voice communications. This permits occupants to lock and unlock the restraining aspect by way of a body worn control panel. Other auxiliary equipment and the data and voice transmission can also be operated from the control panel. In another embodiment, wiring or a conductive pathway for a communications system is integrated into the harness and strap.

Figure 1:
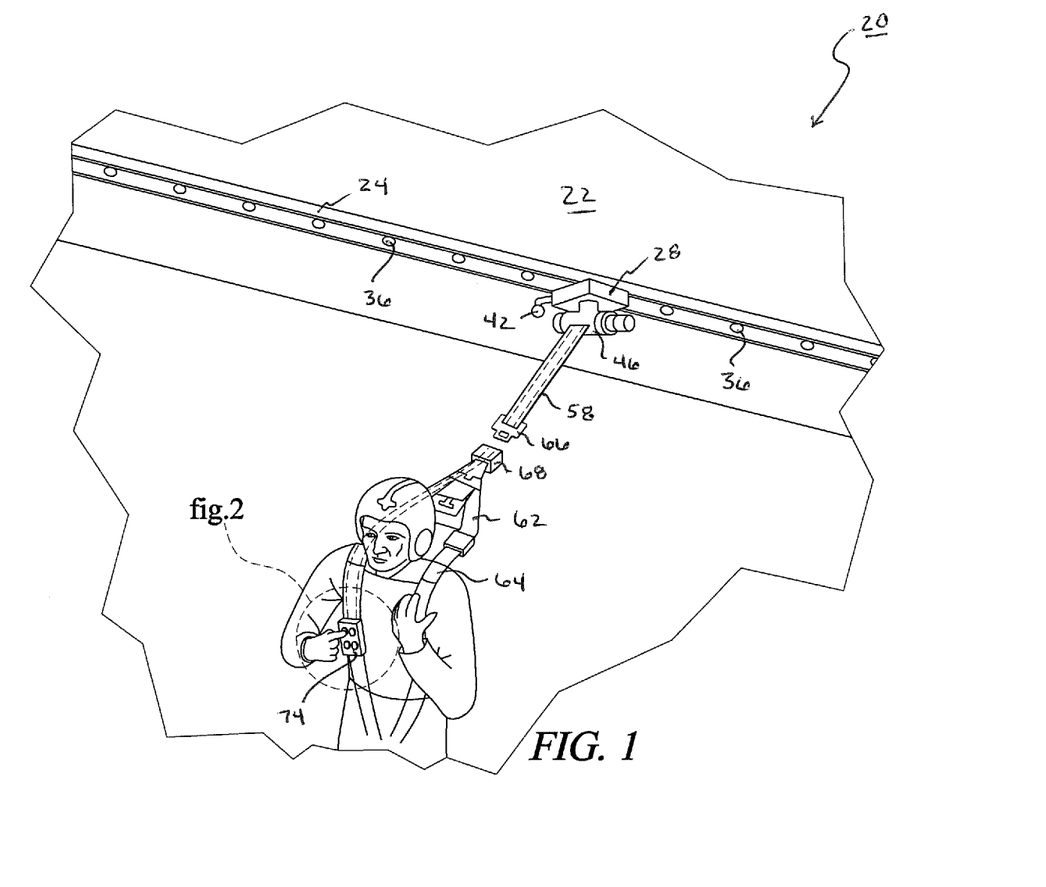
FIG. 1 is a perspective view of the restraint system of the present disclosure.
Figure 2:
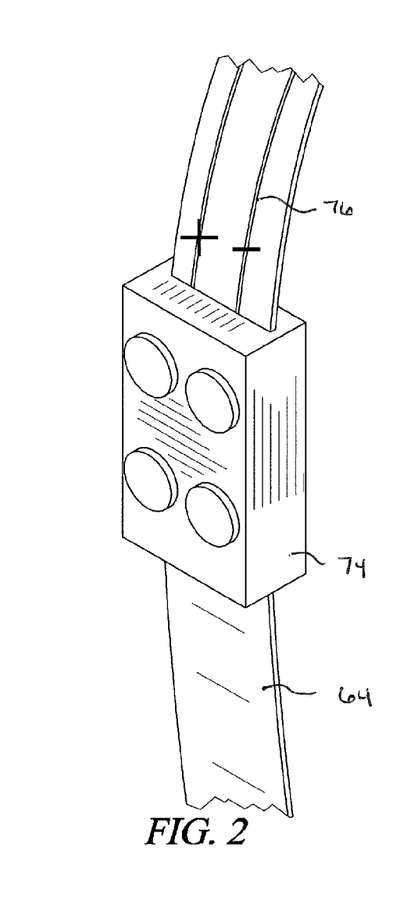
FIG. 2 is a detailed view taken from FIG. 1.

FIG. 1 illustrates the restraint system 20 according to the present invention. The depicted embodiment shows system 20 mounted to the ceiling 22 of an aircraft and restraining an aircrew member. The inventive system 20, however, is not limited to use within aircraft. Additionally, the restraint can be mounted to other interior surfaces, such as sidewalls or floors.

Track and Track Mounting

Figure 6:
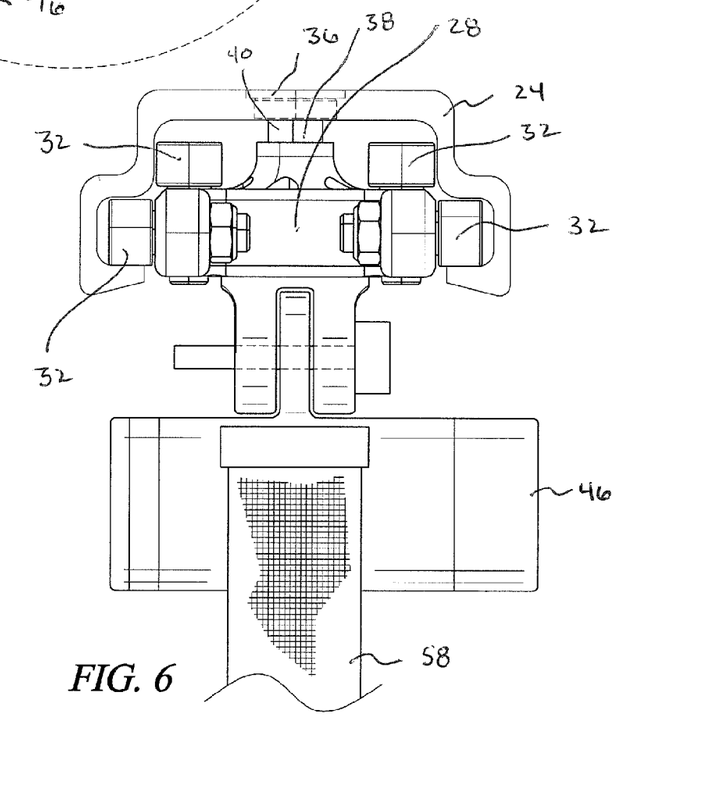
FIG. 6 is a cross-sectional view of track, trolley and reel of the present system.
Figure 7:
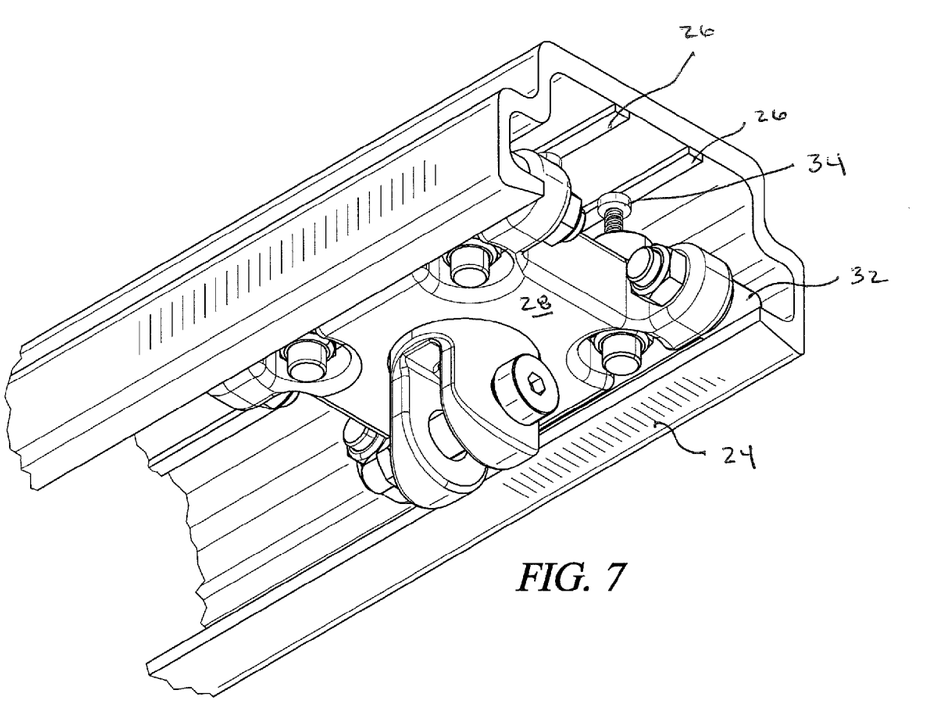
FIG. 7 is a perspective view of the track, trolley, and reel of the present system.

The system 20 includes a track 24 that preferably follows the contours of the interior wall and/or interior ceiling 22. As most clearly depicted in FIG. 6, track 24 includes a C-shaped cross section with an interior surface. As noted in FIG. 7, electrodes 26 can be fitted within the interior surface. Electrodes 26 are preferably insulated from the remainder of track 24 but include exposed portions along the interior surface. These electrodes 26 are, in turn, connected to auxiliary equipment within the aircraft. This auxiliary equipment may include, for example, weapons systems, vehicle doors, or flight controls.

Track 24 is extruded or constructed from sections that may be conformed to the contours of the interior ceiling and/or wall. This permits the smooth travel of the trolley 28 within track 24. Tracks 24 may also include bumpers on one or both ends. The bumpers soften the deceleration of trolley 28 when trolley 28 reaches an end of track 24. Track 24 is shown in a normal working position in FIG. 1 approximately centered between the interior walls. Centering track 24 between walls often allows the best compromise between freedom of movement within the aircraft and protection from injury in the event of a unexpected aircraft motion. Track 24 may also be adapted for easy removal from the interior ceiling or wall. Either retracting or removing the track advantageously allows the aircraft to carry larger (or outsized) cargo.

Trolley Assembly

A wheeled trolley 28 rides within track 24. In the preferred embodiment, trolley 28 includes eight wheels 32. Specifically, four side mounted wheels 32 are positionable within side channels of track 24 and four top mounted wheels 32 rotate along the base of track 24. However, the use of other wheel configurations is within the scope of the present invention. In order to complete an electrical circuit between trolley 28 and the electrodes 26 of track 24, two upstanding electrodes 34 are included. These electrodes 34 extend upwardly from the upper face of trolley 28 and are spring biased into sliding contact with the insulated electrodes 26 of the track.

Trolley 28 is lockable, or fixable, at spaced apart positions via interlock apertures 36 formed along the length of track 24. The interlock apertures 36 are preferably equally spaced along track 24 at one or two foot intervals. Trolley locking mechanism 38 preferably includes a solenoid activated interlock pin 40 that selectively engages one of the locking apertures 36 within track 24 to thereby lock trolley 28 with respect to track 24. When in the activated state, the solenoid maintains pin 40 in a disengaged orientation. When in the deactivated state, pin 40 is permitted to engage one of the locking apertures 36. The control system described below is used activate and/or deactivate the solenoid. In addition to the foregoing, trolley also includes a handle 42 to manually actuate or disengage the interlock pin 40. Trolley 28 is also easily removable from track 24 for maintenance by removing an end plate of track 24 and sliding trolley 28 off an end of track 24.

Trolley 28 also preferably includes a circuit with an accelerometer. The accelerometer senses high acceleration events of either the vehicle or the strap (e.g., accelerations exceeding an acceleration threshold which may be directional) and causes the solenoid to be de-energized and trolley 28 to be locked to prevent injury to the aircrew member. Trolley 28 will thus automatically lock itself to track 24 in a crash event. Thereafter, the user mounted control panel can be used to release trolley 28 and permit further movement. In the alternative, a manual lock 42 (e.g., the trolley handle) can be used a backup in addition to the control panel. If the manual lock is used, trolley 28 will remain locked to track 24 until the manual lock is released.

An example of an accelerometer suitable for use with the present invention is the MA-16-style vehicle acceleration sensor from H. Koch and Sons in Anaheim, Calif. A crash sensor is described in U.S. Pat. No. 6,299,102 for "Aviation Crash Sensor," assigned to the assignee of the present invention. The '102 patent is herein incorporated by reference. Based on the signal received, the circuit may energize or de-energize the solenoid and pull the interconnect pin into an unlocked position, or to release the interconnect pin into a locked position.

Retractor Assembly

A retractor 46 is pivotally attached to the underside of trolley 28. Trolley 28 preferably includes a receptacle for attaching retractor 46 to the trolley 28, which receptacle is preferably a threaded female receptacle for accepting a threaded attachment protruding from the retractor. This connection permits the retractor to rotate 360° about an axis perpendicular to trolley 28. As noted above, retractor 46 stores a length of strap 58 about a rotatable retractor shaft 48. In an manner described more fully hereinafter, a digital encoder 52 is used to detect the length of strap 58 that is extendable from, or retracted into, retractor 46. Strap 58 may further be locked at a specific or limited to a maximum length of extension.

Figure 3A:
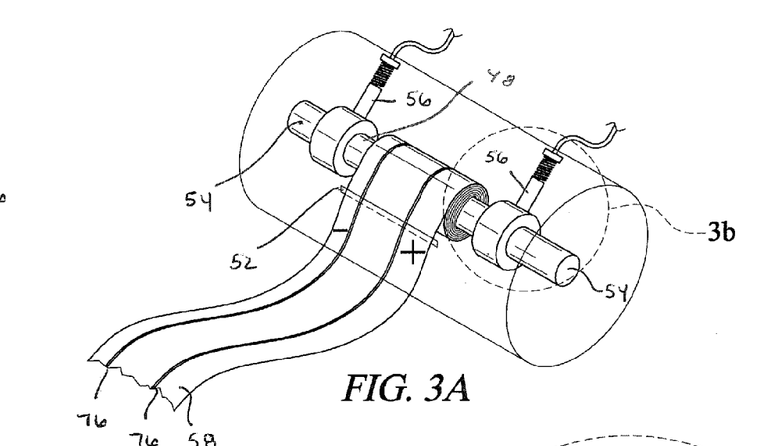
FIG. 3A is a partial sectional view of the reel used in the disclosed system.
Figure 3B:
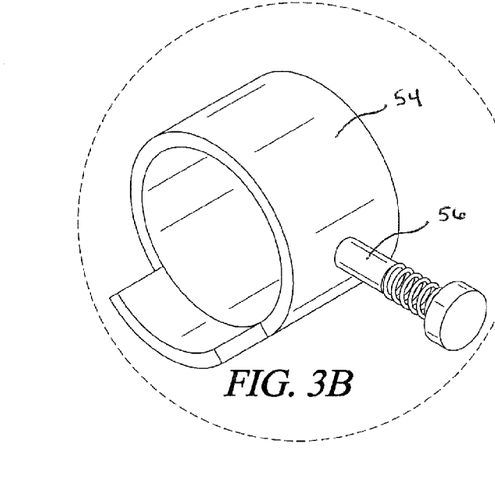
FIG. 3B is a detailed view of one of the bushings taken from FIG. 3A.
Figure 4:
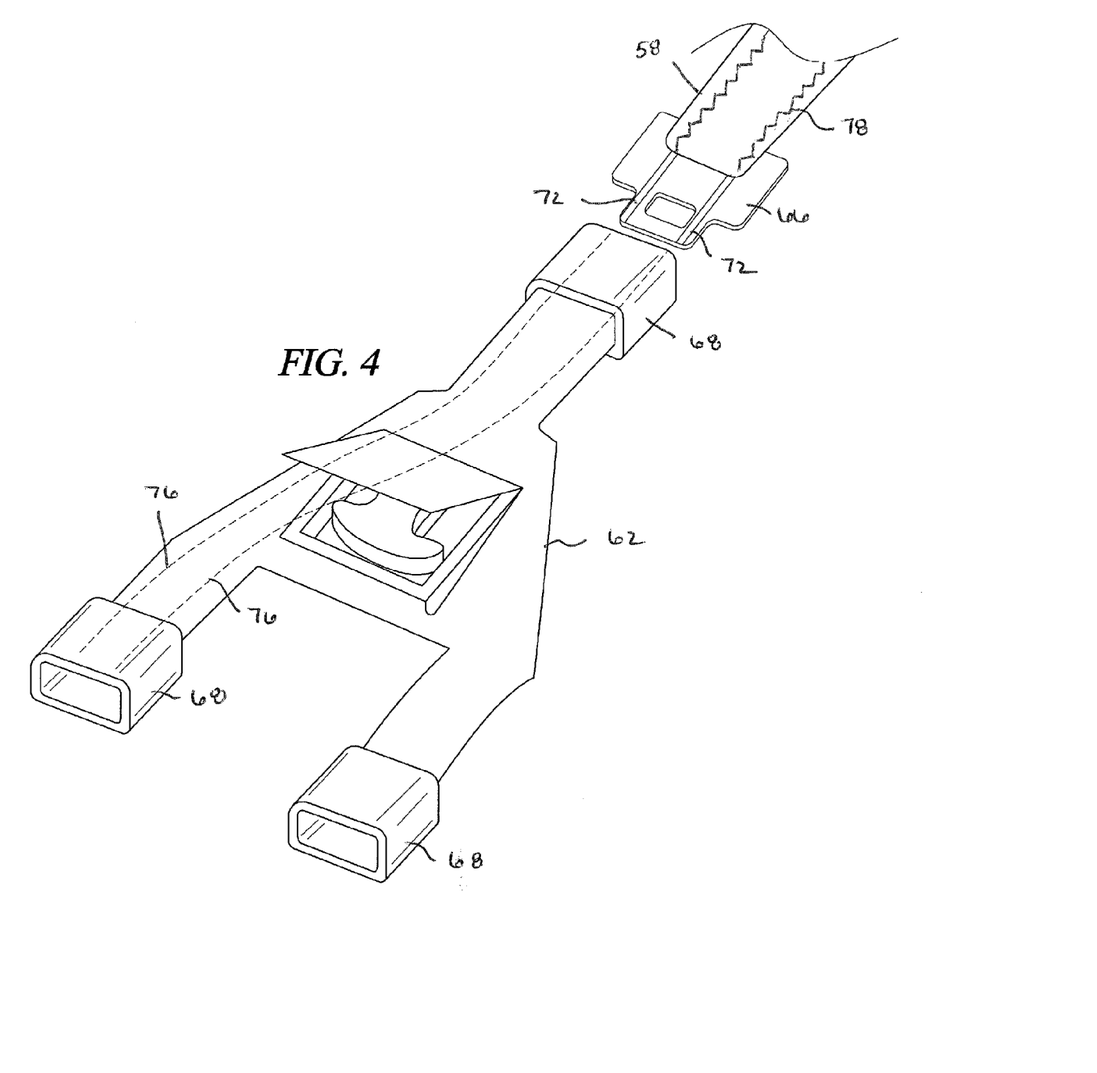
FIG. 4 is a detailed view of the strap and harness connector of the disclosed system.

Retractor 46 also includes paths for conveying charge from the strap 58 to trolley 28. Specifically, retractor shaft 48 includes insulated electrodes for receiving charge from strap 58. Shaft 48 further includes bushings 54 positioned over its opposing ends. These bushings 54 are in electrical communication with the retractor shaft 48 and rotate along with it. As noted in FIG. 3A, a spring biased bearing 56 is in sliding contact with each of the bushings 54. The springs bias the bearings 56 so they maintain positive contact with the bushings 54 as the bushings rotate along with the retractor shaft 48. As such, even as bearings 56 become worn, the bushings 54 and bearings 56 will remain in electrical contact. Wires, in turn, connect bearings 56 to the solenoid and upstanding conductors 34 of trolley 28. Thus, an electrical circuit can be completed from the strap 58, to shaft 48, bushings 54, bearings 56 and wires.

Strap and Harness

Figure 5A:
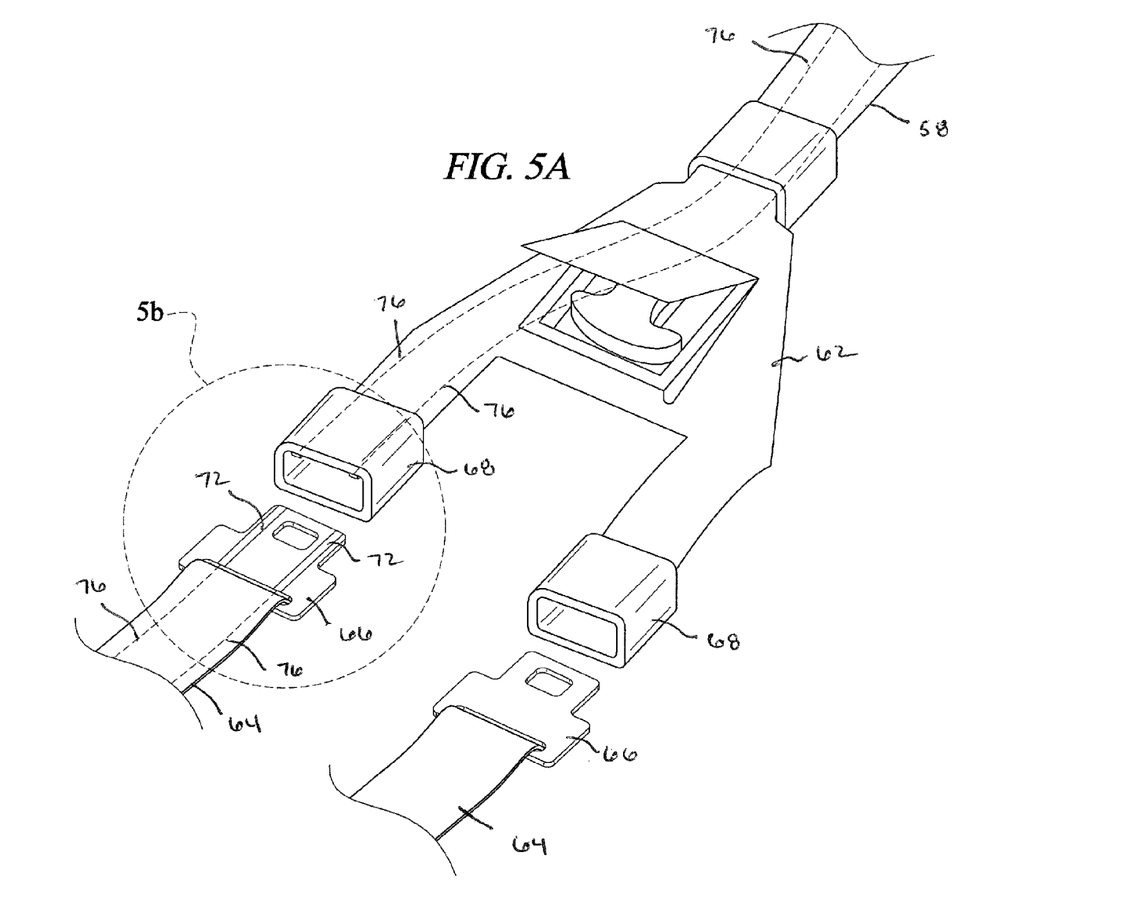
FIG. 5A is a detailed view of the strap, harness connector and harness of the disclosed system.
Figure 5B:
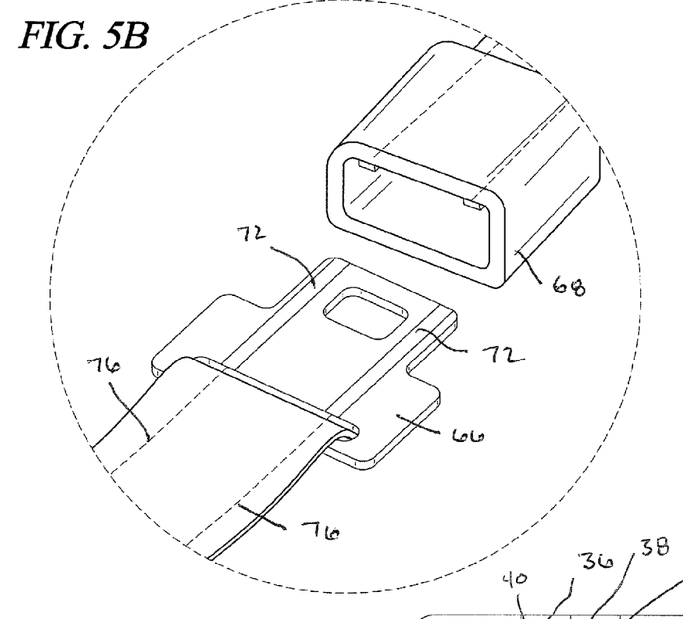
FIG. 5B is a detailed view of one of the buckles used to connect the strap, harness connector, and harness.

A length of strap 58 is connected between the retractor 46 and an A-shaped webbing 62. The A-shaped webbing 62, in turn, is connected to a user worn harness 64. In the preferred embodiment, a fabric strap is employed. The proximal end of strap 58 is coupled to the retractor shaft 48 and the distal end is coupled to A-shaped webbing 62. The interconnection between strap 58, webbing 62, and harness 64 is achieved via a series of male and female buckles (66, 68). Namely, the distal end of the strap 58 includes a first male buckle 66 that is connected to a second female buckle 68 on the A-Shaped webbing 62. The base of the A-shaped webbing 62, in turn, includes two female buckles 68 that can be coupled to corresponding male buckles 66 on the harness. As noted in FIG. 5A, the buckles include insulated electrical connectors 72 to complete an electrical pathway through the harness 64, webbing 62, and strap 58.

In this regard, the strap and webbing (58, 62) include conductive wires 76 woven into the fabric to permit the strap and webbing (58, 62) to carry current. There are other embodiments that allow electrical conductivity to move through or on the textile, such as electrically conductive ink or paints or the threads of the textile itself. In one embodiment, the wires 76 of strap 58 are formed into a zigzag pattern 78 with peaks and valleys. This zigzag pattern 78 permits the digital encoder 52 of retractor 46 to detect the length of strap 58 deployed from, or retracted into, the retractor 46 by sensing the peaks of the conductive wires 76.

Harness 64 is worn by the aircrew member. In the depicted embodiment, harness 64 extends around the legs and over the shoulders of the wearer. Other harness configurations are within the scope of the present invention. As with the strap, harness 64 is preferably formed from a fabric material with interwoven electrical wiring 76. A control panel 74 is integrated into the harness 64 and is in electrical communication with the wiring 76. As illustrated in FIG. 1, control panel 74 is located on the chest of the crewmember.

By way of the foregoing construction, a first electrical path is formed between control panel 74 and the trolley 28. This path allows the user to lock and unlock trolley 28 by merely accessing the body worn controls. More specifically, the first electrical path extends between control panel 74, the wires of the harness 76, the insulated electrical connectors 72 of buckles (66, 68), the wires of the strap 76, the retractor shaft 48, the bushings 54, the bearings 56, the wires, and the trolley lock 38.

A second electrical path can similarly be used to operate the auxiliary equipment within the vehicle via the conductors 26 within the overhead track 24. More specifically, the first electrical path extends between the control panel 74, the wires of the harness 76, the insulated electrical connectors 72 of buckles (66, 68), the wires 76 of strap 58, the retractor shaft 48, the bushings 54, the bearings 56, the wires, the electrodes of the trolley 34, and the electrodes of the track 26.

The strap, webbing, and harness have all been described as employing electrical wiring embedded into a fabric. This construction permits the fabric to convey current without risking injury to the crewmember. However, other constructions for the strap, webbing, and harness are within the scope of the present invention. For example, these components can be formed from any of a variety of known conductive fabrics. Conductive textiles are made with metal strands woven into the construction of the textile. This permits electrical conductivity without sacrificing the flexibility or wearability of the fabric. Still yet other conductions can be employed for embedding the wiring into the fabric. The wiring can be braded into the fabric to accommodate needed stretching. The wiring can also be placed between a multilayer fabric construction. The wires can also be stitched, laminated, or glued onto the fabric. In still yet another construction, the wires can be replaced by a conductive ink that is sprayed onto the fabric.

Additionally, the strap, webbing, and harness can also include wiring for communications embedded or woven into the fabric. This construction would permit communications systems to be integrated into the restraint system. In any other application, the embedded wiring can be used to monitor biometric signals from the wearer, such as heart beat, body temperature, and breathing.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A restraint and control system for use within a vehicle, the system adapted to restrain a crewmember and permit crewmember control of auxiliary equipment within the vehicle, the system comprising:
   a track connected to the vehicle, the track including a conductive track pathway in communication with the auxiliary equipment;
   a trolley movably positioned within the track, the trolley including a conductive trolley pathway in communication with the track pathway;
   a harness worn by the crewmember and interconnecting the crewmember to the trolley, the harness including a control panel;
   control wires woven into the harness, the control wires being in communication with the control panel, the trolley pathway, the track pathway, and the auxiliary equipment, whereby the crewmember can use the control panel to operate the auxiliary equipment and;
   a tether connected between the harness and trolley, wherein the tether includes control wires in communication with the control wires of the harness and the trolley pathway.

2. The system as described in claim 1 wherein the harness is constructed from a conductive textile.

3. The system as described in claim 1 wherein the tether is constructed from a conductive textile.

4. The system as described in claim 1 further comprising a lock adapted to selectively lock the trolley with respect to the track.

5. The system as described in claim 4 wherein the control panel can be used to selectively operate the lock.

6. The system as described in claim 1 further comprising an inertial reel for dispensing and retracting the tether.

7. The system as described in claim 1 wherein the auxiliary equipment includes a weapons system.

8. The system as described in claim 1 wherein the auxiliary equipment includes a vehicle door.

9. The system as described in claim 1 wherein the auxiliary equipment includes a communications system.

10. A restraint and control system for use within a vehicle, the system adapted to restrain a crewmember, the system comprising:
  a track connected to the vehicle, the track including a conductive track pathway;
  a trolley movably positioned within the track, the trolley including a conductive trolley pathway in communication with the track pathway;
  a harness worn by the crewmember and interconnecting the crewmember to the trolley, the harness including a control panel, the control panel being in communication with the trolley pathway and track pathway; and
  a tether connected between the harness and trolley, wherein the tether includes control wires in communication with control wires of the harness and the trolley pathway.

11. The system as described in claim 10 further comprising control wires woven into the harness, the control wires being in communication with the control panel, the trolley pathway, and the track pathway.

12. The system as described in claim 11 further comprising auxiliary equipment associated with the vehicle and wherein the control panel is used to operate the auxiliary equipment.

13. The system as described in claim 12 wherein the auxiliary equipment includes a weapons system.

14. The system as described in claim 12 wherein the auxiliary equipment includes a vehicle door.

15. The system as described in claim 12 wherein the auxiliary equipment includes an inertial reel.

16. The system as described in claim 10 wherein the harness is constructed from a conductive textile.

17. The system as described in claim 10 further comprising a lock adapted to selectively lock the trolley with respect to the track.

\* \* \* \* \*

UNITED STATES PATENT AND TRADEMARK OFFICE
CERTIFICATE OF CORRECTION

| | | |
|---|---|---|
| PATENT NO. | : 8,746,739 B2 | Page 1 of 1 |
| APPLICATION NO. | : 13/166217 | |
| DATED | : June 10, 2014 | |
| INVENTOR(S) | : Daniel Meggs et al. | |

It is certified that error appears in the above-identified patent and that said Letters Patent is hereby corrected as shown below:

On the Title Page, Item (73) Assignee Name,
"-Carlston-" should read --Carleton--.

Signed and Sealed this
Twelfth Day of August, 2014

Michelle K. Lee
*Deputy Director of the United States Patent and Trademark Office*